Patented Nov. 8, 1927.

1,648,214

UNITED STATES PATENT OFFICE.

LUDWIG BENDA, OF MAINKUR, NEAR FRANKFORT-ON-THE-MAIN, GERMANY, ASSIGNOR TO I. G. FARBENINDUSTRIE AKTIENGESELLSCHAFT, A CORPORATION OF GERMANY.

BENZOXAZOLONE ARSONIC COMPOUNDS.

No Drawing. Application filed June 2, 1924, Serial No. 717,439, and in Germany June 9, 1923.

My invention relates to a new benzoxazolone arsonic compound of the formula:

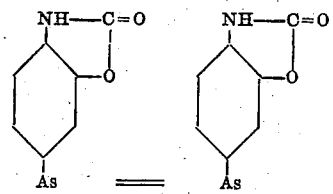

which may be obtained either by acting with phosgene on the corresponding ortho-aminohydroxyderivative of arsenobenzene or by treating the respective derivative of the corresponding arsonic acid with phosgene and reducing the benzoxazolone arsonic acid thus formed to the arseno compound.

The new compound, though not containing the therapeutically and chemically active groups $NH_2$ and OH, shows a surprisingly strong curative effect in certain infection diseases. In contrast to its parent materials it possesses a lesser toxicity and better stability.

Example 1.

50 gr. 4.4[1]-diamino-3.3[1]-dihydroxyarsenobenzene-hydrochloride (Benda B.B.44, p. 3579/1911) are dissolved—with the exclusion of air—in 2000 cc. water and 300 cc. caustic soda solution 10 times normal. Phosgene is introduced at ordinary temperature. If an acid reaction has set in, further 200 cc. caustic soda solution are added 10 times normal and this proceeding repeated until a test cannot be diazotized any longer. The precipitate is filtered by suction, well washed with water, alcohol and ether in a current of nitrogen, and dried in vacuo.

The aforesaid reaction takes place according to the following equation:

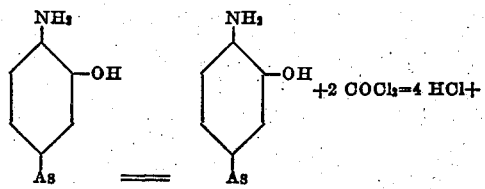 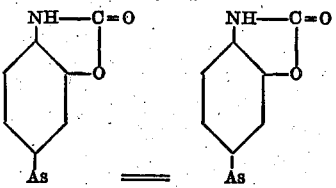

The new compound represents a yolk-coloured powder insoluble in water, only sparingly soluble in dilute caustic soda solution, it dissolves in a hydrochloric acid suspension with the addition of sodium nitrite. This solution is colorless and cannot be coupled with the azo components, whilst the primary material under identical conditions yields a yellow diazo compound which changes to an intense red if coupled with resorcine.

Example 2.

100 gr. 4-amino-3-hydroxybenzene-1-arsonic acid are dissolved at 70–80° C. in 1200 cc. sodium acetate solution double normal. Into the solution which has been cooled down to ordinary temperature phosgene is introduced until the solution shows a strong mineral acid reaction. The product of reaction precipitates, is filtered by suction, dried and further treated as follows:

50 gr. thereof are mixed with 550 cc. methylated spirit and 140 cc. concentrated hydrochloric acid, then is added at ordinary temperature a solution prepared as follows:

100 gr. sodium hypophosphite are dissolved in 50 cc. of hot water and mixed with 200 cc. hydrochloric acid 1.18 specific gravity and 500 cc. methylated spirit; the cooled solution is filtered from the separated common salt and then poured together with the arsonic acid solution (see above). Some hydroiodic acid is added and the solution heated to 35–40° C. A slightly yellow precipitate is formed, which is identical with the product obtainable according to Example 1.

The aforesaid reaction takes place according to the following equation:

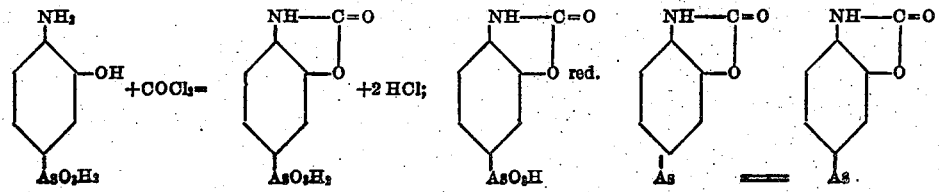

Having now particularly described and ascertained the nature of my said invention and in what manner the same is to be performed, I declare, that what I claim is:

As a new product the benzoxazolone arsonic compound of the formula:

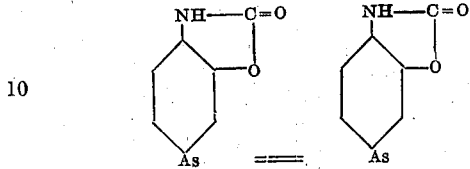

which is when dry a yolk-colored powder, insoluble in water only sparingly soluble in dilute caustic soda solution, soluble in a hydrochloric acid suspension with the addition of sodium nitrite to a colorless solution, which cannot be coupled with azo components, said compound being substantially identical with such a one obtainable by acting with phosgene on 4.4'-diamino-3.3'-dihydroxy-benzene-1-arsenobenzene or by treating the 4-amino-3-hydroxy-benzene-1-arsonic acid with phosgene and reducing the benzoxazolone arsonic acid thus formed to the arsenocompound.

In witness whereof I have hereunto signed my name this 16th day of May, 1924.

LUDWIG BENDA.